United States Patent [19]

Fukuda et al.

[11] Patent Number: 4,723,205
[45] Date of Patent: Feb. 2, 1988

[54] MICRO COMPUTER SYSTEM

[75] Inventors: Joji Fukuda, Kanagawa; Akira Takezawa, Tokyo; Yutaka Ohkubo, Kanagawa; Kenichi Kobayashi, Kanagawa; Toshinori Nakamura, Kanagawa, all of Japan

[73] Assignee: Sony Corporation, Tokyo, Japan

[21] Appl. No.: 814,076

[22] Filed: Dec. 23, 1985

Related U.S. Application Data

[63] Continuation of Ser. No. 487,575, Apr. 22, 1983, abandoned.

[30] Foreign Application Priority Data

May 10, 1982 [JP] Japan ................................. 57-78017

[51] Int. Cl.⁴ ........................ G06F 13/00; G06F 13/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,130,865 | 12/1978 | Heart | 364/200 |
| 4,149,242 | 4/1979 | Pirz | 364/200 |
| 4,181,936 | 1/1980 | Kober | 364/200 |
| 4,257,099 | 3/1981 | Appelt | 364/200 |
| 4,276,594 | 6/1981 | Morley | 364/200 |
| 4,370,708 | 1/1983 | Bruce et al. | 364/200 |
| 4,387,424 | 6/1983 | Frediani et al. | 364/200 |
| 4,390,943 | 6/1983 | Twibell et al. | 364/200 |
| 4,412,282 | 10/1983 | Holden | 364/200 |
| 4,442,504 | 4/1984 | Dummermuth | 364/900 |
| 4,443,846 | 4/1984 | Adcock | 364/200 |
| 4,453,211 | 6/1984 | Askinazi et al. | 364/200 |

Primary Examiner—David Y. Eng
Attorney, Agent, or Firm—Lewis H. Eslinger; Alvin Sinderbrand

[57] ABSTRACT

A microcomputer system has two central processing units, an original and one added to expand the system, each having an associated memory and being interconnected through an appropriate signal bus arrangement, however, only the first or original central processing unit employs an input/output device for inputting/outputting data; a bus controller and bus arbiter including a status signal generator are connected to the signal bus to provide addresses to permit the second or added central processing unit to be mapped onto the input-/output address of the first central processing unit. The first central processing unit and its associated memory circuits and buses and the like then appear as peripherals with direct memory access from the viewpoint of the second or added central processing unit. A priority decoder is provided to insure that the first central processing unit has bus priority over the second central processing unit.

17 Claims, 4 Drawing Figures

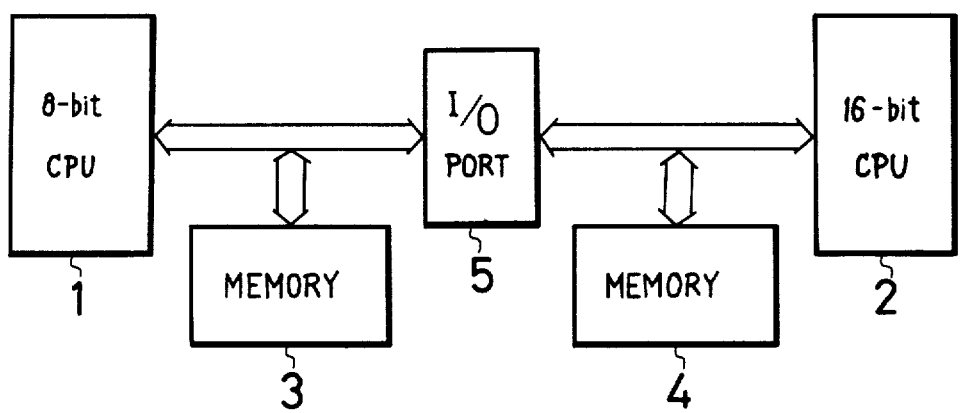
FIG. 1 (PRIOR ART)
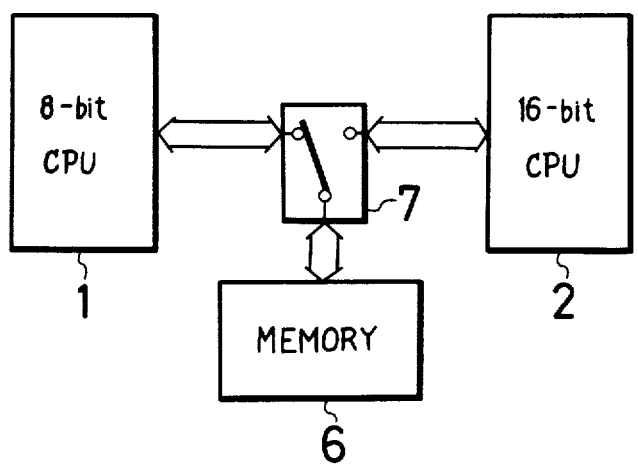
FIG. 2 (PRIOR ART)
FIG. 3
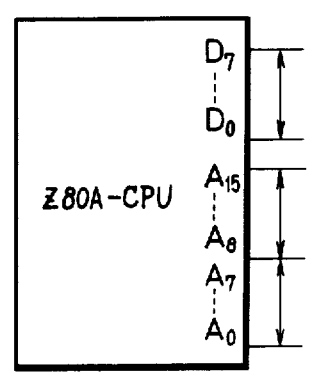

MICRO COMPUTER SYSTEM

This is a continuation of application Ser. No. 487,575 filed Apr. 22, 1983, now abandoned.

BACKGROUND OF THE INVENTION

1. Field of the Invention

The present invention relates in general to microcomputer systems and, particularly, to microcomputer systems employing a plurality of processing units connected to provide expanded direct memory addresses and improved data processing speed.

2. Description of Prior Art

Computers have become a part of everyday life at all levels, including the so-called personal computers utilized by individuals in the home, as well as in the office. The majority of the personal computers now available utilize microprocessors built around an 8-bit central processing unit (CPU).

This kind of 8-bit central processing unit handles 16-bit addresses and 8-bit data at one time in order to process the data stream. In an attempt to increase the processing speed and also to increase the directly accessible addresses, it has been suggested to add an additional central processing unit to the 8-bit central processing unit typically found in such personal computers. The central processing unit to be added is preferably a 16-bit central processing unit. The resultant system formed by the addition of the 16-bit central processing unit is a personal computer or microcomputer that is managed by two central processing units. Two such systems that have been previously suggested are shown in FIGS. 1 and 2. In FIG. 1, originally provided 8-bit central processing unit 1 has associated with it an appropriate memory 3 and added to this central processing unit 1 is 16-bit central processing unit 2, which has associated with it memory 4. The 8-bit central processing unit 1 and 16-bit central processing unit 2 are connected to each other through appropriate signal buses by means of input/output (I/O) port 5.

In the system of FIG. 1 central processing units 1 and 2 can use or access memories 3 and 4 separately and are capable of simultaneous data processing. Moreover, by use of input/output port 5, the transfer of data between central processing units 1 and 2 is made possible.

Nevertheless, even though the system of FIG. 1 results in additional processing capability provided by the 16-bit central processing unit 2 and its associated memory 4, in this computer system when data is to be transferred between central processing unit 1 and central processing unit 2, the so-called "handshake" operation is necessary for each data byte. This repeated required handshake operation severely slows down the transfer or handling of data. Thus, while the overall computing capability is increased, the speed of operation is decreased.

Another proposed approach to expanding the capabilities of a personal computer or microcomputer is shown in FIG. 2. In this system, additional 16-bit central processing unit 2 is added to original 8-bit central processing unit 1. In this system memory 6 is selectively connected to either of central processing units 1 or 2 by multiplexer 7, which is represented as a switch in FIG. 2. While multiplexer 7 functions at a relatively high speed, the central processing units 1 and 2 are not capable of simultaneous data processing, since memory 6 can be connected to only one of the two central processing units at a time. Therefore, while high-speed data transfer between the two central processing units (the original and the newly added one) is made possible, the dual central processing system cannot be advantageously utilized because it is not capable of simultaneous data processing.

OBJECTS AND SUMMARY OF THE INVENTION

Accordingly, it is an object of the present invention to provide a microcomputer system that includes an additional central processing unit and that expands the capabilities of the processing unit.

Another object of the present invention is to provide a microcomputer system of the dual central processing kind that is capable of high-speed data transfer processing.

A further object of the present invention is to provide a microcomputer system of the dual central processing unit kind in which two central processing units can perform, respectively, data processing simultaneously.

In one aspect of the present invention a microcomputer system having two central processing units is provided, wherein an input/output means is connected to a first central processing unit for inputting and outputting data and a first memory is connected to the first central processing unit. A second memory is then connected to a second central processing unit wherein the second memory is allocated to an input/output address of the first central processing unit. The second central processing unit and its associated memory are allocated to an input/output address of the original central processing unit, and the original central processing unit and its associated memory are accessed by the second additional central processing unit in a direct memory access mode (DMA).

The above, and other objects, features and advantages of the present invention will be apparent from the following detailed description of illustrative embodiments, which is to be read in connection with the accompanying drawings, in which the same reference numerals identify the corresponding elements and parts in the several views.

BRIEF DESCRIPTION OF THE DRAWINGS

FIG. 1 is a block diagram of a prior art microcomputer system employing an additional central processing unit and additional memory;

FIG. 2 is a block diagram of a prior art microcomputer system employing an additional central processing unit, utilizing a single memory and a multiplexer;

FIG. 3 is a schematic representation of the electrical connection pin arrangement of a Z80A central processing unit upon execution of input/output instructions.

DESCRIPTION OF A PREFERRED EMBODIMENT

Figure 4:
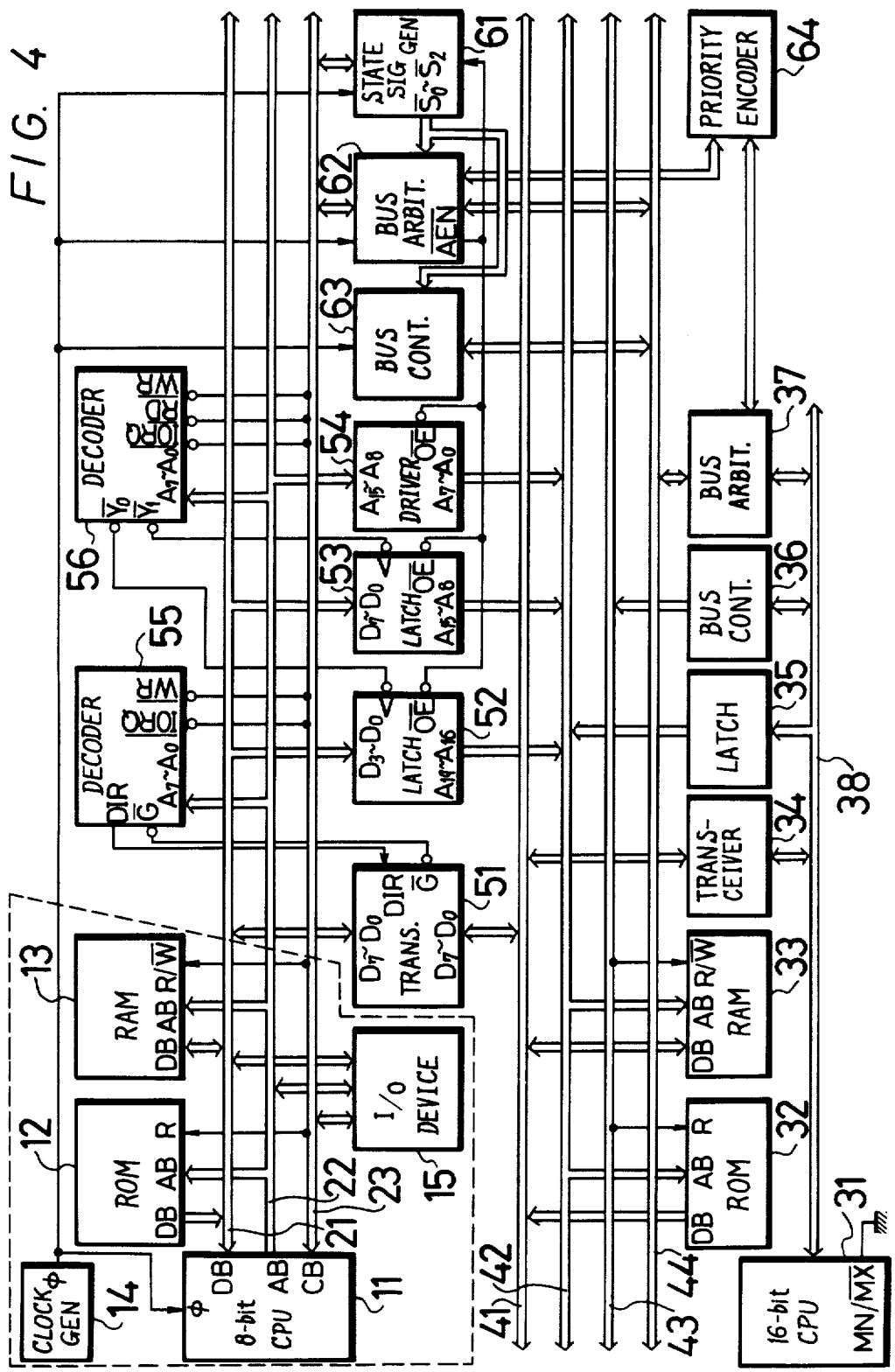
FIG. 4 is a schematic diagram showing a microcomputer system according to the present invention.

Referring now to FIG. 4, which shows a microcomputer system that has been modified according to the present invention, 8-bit parallel central processing unit 11 is employed, and this type of microprocessor might be exemplified by the Z80A-CPU micro processor chip manufactered by Zilog, Inc. Nevertheless, microprocessor chips from other manufacturers can be advantageously used in the present invention. In order to simplify the following explanation the various instructions and the like will be set forth as those which are employed in the Z80A-CPU. In addition to the basic load instructions, calculation instruction and the like, the Z80A central processing unit 11 has the following input/output (I/O) instruction:

I - 1: IN A, n

This instruction orders data from a peripheral device of the input/output address n (n=0 to 255) to be input to an A register.

I - 2: OUT n, A

This instruction orders the microprocessor to send data stored in the A register to the peripheral device having the input/output address n.

Referring back now to FIG. 3; which shows the pin layout of central processing unit 11 as embodied by a Z80A upon execution of the above input/output instructions, data terminals $D_0$ to $D_7$ and the uppermost 8-bit address terminals $A_8$ to $A_{15}$ of central processing unit 11 are assigned or allocated to data for accessing the A register. Similarly, the lowermost 8-bit address terminals $A_0$ to $A_7$ of central processing unit 11, as represented in FIG. 3, are allocated to input/ouput address n.

II - 1: IN r, (C)

This instruction orders data to be sent from the peripheral device connected to the input/output address specified by BC registers to some register r, where the r register is one of the A, B, C, D, E, H, and L registers.

II - 2: OUT (C), r

Similarly, this instruction orders data to be sent from the r register to the peripheral device connected to the input output address specified by the BC registers.

When executing the above input/output instructions and with reference again to FIG. 3, the data terminals $D_0$ to $D_7$ of central processing unit 11 are assigned to data for the r register, with the lower 8-bit address terminals $A_0$ to $A_7$ thereof being allocated to data for the C register, and the uppermost 8-bit address terminals $A_8$ to $A_{15}$ being allocated to data for the B register.

Referring now to the system shown in FIG. 4, read only memory (ROM) 12 contains a monitor program and a BASIC interpreter program, for example, and random access memory (RAM) 13 is provided for a work area and/or a user area. The read only memory 12 and random access memory 13 are connected to each other by data bus 21, address bus 22, and control bus 23.

Clock signal generator 14 provides a constant clock signal to central processing unit 11 in order to assure system timing. Data bus 21, address bus 22, and control bus 23 are all connected to a generalized input/output device 15 of the kind typically required in a general computer system, such as to operate a keyboard, a cathode ray tube controller, a cathode ray tube monitor, or the like. The elements described so far represent a system typically used for microcomputer or personal computer applications. The present invention teaches the addition of a second processing unit, shown in FIG. 4 as a 16-bit parallel central processing unit 31 to the system described above. Typical of this type of 16-bit central processing unit is the I8086-central processing unit manufactured by Intel Corp., which is operated in its maximum mode. It is understood, of course, that this specific brand is merely given by way of example only and several equivalent central processing units are commercially available for use. Associated with 16-bit central processing unit 31 is read only memory (ROM) 32 for storing a program and random access memory (RAM) 33 for providing work area and user area, transceiver 34, latch circuit 35, bus controller 36, and bus arbiter 37. Local bus 38 interconnects 16-bit central processing unit 31 with transceiver 34, latch 35, bus controller 36, and bus arbiter 37. Read only memory 32 and random access memory 33 are similarly interconnected via data bus 41 that functions as the system bus and has associated with it address bus 42 and control bus 43. Bus control line 44 is provided for the system bus.

The 8-bit central processing unit 11 and 16-bit central processing unit 31 must be specifically controlled to access the memories through the multi-bus by bus controller 36 and by bus controller 63. Such control is provided by the bus arbiter units 37,62 arranged as shown in FIG. 4. For example, when central processing unit 31 reads and/or writes data from and/or to random access memory 33, (Z80A) central processing unit 11 cannot access random access memory 33 until the bus cycle of (I8086) central processing unit 31 ceases. This control is performed by bus arbiter 37. The transceiver 34, latch 35, bus controller 36, and bus arbiter 37 are formed of commercially available integrated circuits, specifically I8286, I8282, I8288, and I8289, respectively. These integrated circuits are utilized solely in a general way in response to the maximum mode of the (I8086) central processing unit 31 and, since such operation is well known in the art, further details thereof are not set forth.

In order to establish the dual central processing system employing central processing unit 11 and central processing unit 31 according to the present invention, a particular arrangement is provided whereby central processing unit 31 and its associated circuits, that is, read only memory 32, random access memory 33, transceiver 34, latch 35, bus controller 36, bus arbiter 37, local bus 38, and data bus 41 are mapped onto the input-/output address of the 8-bit central processing unit 11, while the 8-bit central processing unit 11 and its associated circuits including read only memory 12, random access memory 13, clock generator 14, input/output device 15, data bus 21, address bus 22, and control bus 23 are arranged as the peripheral circuit having direct memory access (DMA) as viewed from central processing unit 31. In the embodiment shown in FIG. 4, 8-bit central processing unit 11, as represented by integrated circuit Z80A, has a bus priority over the 16-bit central processing unit 31, as represented by integrated circuit I8086. In the embodiment of the invention shown in FIG. 4, it can be considered that the computer employing the Z80A-central processing unit 11 as its processor and the computer employing the I8086-central processing unit 31 as its processor are combined, however, the computer system employing the I8086-central processing unit 31 has no input/output device. Therefore, it is necessary for the latter computer to utilize the input-/output device 15 to communicate with the Z80A-central processing unit 11.

Accordingly, in this case, data input, data processing, and data output are performed by both of the two central processing units 11 and 13 in the embodiment of FIG. 4. As is well known, because the I8086 central processing unit 31 is a 16-bit processor, it is very well adapted to perform data processing, whereas because the Z80A central processing unit 11 is an 8-bit processor it is well adapted to perform data input and output. The present invention provides a system wherein the two central processing units 11 and 13 can operate together in parallel, thereby providing total data processing in a relatively high-speed fashion. To accomplish such high-speed data processing utilizing these two processors the present invention provides an 8-bit transceiver 51 connected between the two data buses 21 and 41. A decoder 55 is provided, which is supplied with the lower 8 bits of the address $A_7$ to $A_0$, from address bus 22 and read and write signals from control bus 23, thereby to generate an input/output address signal and a direction signal. The input/output address signal produced by decoder 55 is supplied to transceiver 51 as its gate signal G and the direction signal produced by decoder 55 is fed to transceiver 51 to control the direction of data flow therethrough.

A 4-bit latch 52 is supplied at its data input terminals with the lower 4-bits $D_3$ to $D_0$ from data bus 21 and the output of 4-bit latch 52 is connected to the upper 4-bits $A_{19}$ to $A_{16}$ of address bus 42. An 8-bit latch 53 is connected with data bus 21 at its input terminal and has its output terminals connected to the middle 8-bits $A_{15}$ to $A_8$ of address bus 42. These middle 8-bits $A_{15}$ to $A_8$ of address bus 22 are coupled through bus driver 54 to the lower 8-bits $A_7$ to $A_0$ of address bus 42.

Decoder 56 is connected to receive the lower 8-bits $A_7$ to $A_0$ from address bus 22 and also to receive the input/output request signal, the read signal, and the write signal from control bus 23 thereby to decode the input/output addresses. Decoder 56 produces $\overline{Y}_0$ and $\overline{Y}_1$ supplied to latch unit 52 and latch unit 53 respectively, to act as the clock inputs to these latch elements.

Accordingly, as viewed from central processing unit 11, central processing unit 31, and associated circuits 32 through 44 are mapped onto the input/output addresses by means of circuits 51 through 54.

As shown in FIG. 4, status signal generator 61 is connected to control bus 23 and also to bus arbiter 62 and bus controller 63. Status signal generator 61 generates status signals $\overline{S}_0$ to $\overline{S}_2$ which are the equivalent of status signals $\overline{S}_0$ to $\overline{S}_2$ of central processing unit 31 in the maximum mode. To accomplish this, status signal generator circuit 61 consists of three D-type flip flop circuits and well-known associated logic circuits coupled to control bus 23 and supplied with clock signals from clock generator 14 and an address enable signal $\overline{AEN}$ from bus arbiter 62, thereby to generate status signals $\overline{S}_0$ to $\overline{S}_2$.

Status signals $\overline{S}_0$ to $\overline{S}_1$ and the clock signal from clock generator 14 are both supplied to bus arbiter 62 and bus controller 63. Bus controller 63 also being connected to control bus 43 and bus arbiter being connected to control bus 23, as well as to control bus 44.

Accordingly, by means of status signal generator circuit 61, bus arbiter 62, and bus controller 63 the Z80A-central processing unit 11, as viewed from central processing unit 31, can be regarded as an equivalent central processing unit, that is, equivalent to the I8086 central processing unit 31 in the maximum mode.

A priority encoder 64 is connected between bus arbiter 62 and bus arbiter 37, thereby giving Z80A central processing unit 11 a bus priority over I8086 central processing unit 31. Bus arbiter 62, bus controller 63, and priority encoder 64 are of the conventional kind known to those with ordinary skill in the microprocessor art, as were transceiver 34, latch 35, bus controller 36, and bus arbiter 37. The address enable signal $\overline{AEN}$ from bus arbiter 62 is fed to latch 52, latch 53, and driver 54 as their output enable signal, that is, their gate signal, respectively.

In an example of the operation of the above-described system central processing unit 11, clock generator 14 data bus 21, address bus 22, and control bus 23 comprise a so-called "host" computer, with the remaining circuit elements as described above preferably being packaged in such a fashion as to be simply plugged into the host computer. According to such an arrangement, when accessing of data is not being performed between central processing unit 11 and central processing unit 31, central processing unit 11 performs data processing in accordance with the program that has been loaded into read only memory 12, while central processing unit 31 performs data processing in accordance with the program contained within its associated read only memory 32. Thus, the two central processing units 11 and 31 can simultaneously perform data processing completely independently.

In the system of FIG. 4 taught by the present invention, when accessing of data is desired the following operations would be performed where data is transferred from central processing unit 11 to central processing unit 31. That situation can be arbitrarily referred to as Case A. The following then are the various operations which could occur and the manner in which such operations could be instructed.

A-i: By means of the I/O output instruction from central processing unit 11 latch 52 is addressed to latch therein the uppermost 4-bits $A_{19}$ to $A_{16}$ of random access memory 33. This represents the header addresses to which the data is transferred.

A-ii: By means of the I/O output instruction from central processing unit 11 latch 53 is addressed to latch thereinto the middle 8-bits $A_{15}$ to $A_8$ of random access memory 33.

A-iii: One byte of data at a certain address of random access memory 33 will be loaded into a register of the central processing unit 11, for example register A.

A-iv: Among the I/O output instructions from central processing unit 11 the output instruction OUT (C), A is executed. This is in accordance with instruction II-2 described above. Upon the occurrence of this output instruction, the data stored in the B register of central processing unit 11 are fed through driver 54 to random access memory 33 as the eight lower address bits $A_7$ to $A_0$. Simultaneously, the data in the C register of central processing unit 11 is decoded by decoder 55 to address transceiver 51 to put it into its feed forward mode so that the data stored in the A register of central processing unit 11 can be supplied to random access memory 33. In this case, since the address enable instruction $\overline{AEN}$="L" has been established, random access memory 33 is put into the write mode by bus controller 36 and the addresses of random access memory 33 are designated by the outputs from latch 52, latch 53, and driver 54 so that the data in the A register of central processing unit 11 are written into random access memory 33 at addresses specified by latch 52, latch 53, and driver 54.

Specifically, one-byte data at a certain address of random access memory 13 is transferred to a certain address of random access memory 33, and upon this data transfer, the bus arbiter 37 controls central processing unit 31 to place it into its waiting state and data bus 41, address bus 42, and control bus 43 are all isolated from the side of the system represented by central processing unit 31.

A-v: The steps A-iii and A-iv will be repeated to transfer the data from random access memory 13 to random access memory 33 one byte at a time. If necessary, the instructions relative to A-i and A-ii as described above will also be repeated.

A-vi: After the transfer of all data, a flag is sent to a particular address in random access memory 33, for example, in the same fashion as the data transfer described above. The setting of this flag indicates that the data transfer is finished.

The other mode of operation will be referred to as Case B and relates to the situation when data is transferred from central processing unit 31 to central processing unit 11, that is the reverse direction from Case A.

B-i: Latch 52 is addressed by the I/O output instruction from central processing unit 11 to cause it to latch thereinto the upper four bits $A_{19}$ to $A_{16}$ of random access memory 33, these four bits comprise the header address bits of central processing unit 11.

B:-ii Latch 53 is addressed by I/O output instructions from central processing unit 11 to cause it to latch thereinto the middle 8 bits $A_{15}$ to $A_8$ of random access memory 33.

B-iii: Among the I/O input instructions from central processing unit 11, as described hereinabove, the input instruction IN (C), A is executed. This is in accordance with instruction II-1 described above. On the occurrence of this input instruction, the data stored in the B register of central processing unit 11 is supplied through driver 54 to random access memory 33, as its lower 8-bits of address $A_7$ to $A_0$. Simultaneously, the data in the C register of central processing unit 11 is decoded by decoder 55 and in this fashion transceiver 51 is addressed so as to be put in its read direction mode. Thus, one byte of data of random access memory 33 is then latched into the A register. The addresses of random access memory 33 at this time are designated by the outputs from latch 52, latch 53, and driver 54, just as was accomplished in regard to the Case A instructions above.

B-iv: The data latched in the A register of central processing unit 11 is transferred to random access memory 13. As described above, one byte of data of random access memory 33 is transferred to random access memory 13.

B-v: The above-described instructions B-iii and B-iv are repeated as necessary to transfer the data stored in random access memory 33, one byte at a time, to random access memory 13 to complete the data transfer. Instructions B-i and B-ii can also be repeated in this sequence if required.

If necessary, prior to the B-i instruction, for example, central processing unit 11 checks the flag raised at the particular address in random access memory 33, as described above, thereby to check whether it is ready to transfer the data.

Thus, according to the present invention, the two central processing units, 11 and 31, can perform the respective data processing completely independently, as well as simultaneously.

Moreover, because it is only necessary to perform a single handshake for all data to be transferred, the data transfer between central processing units 11 and 13 can be performed at relatively high speed. In the above described system, the memory can be coupled to the local bus 38.

The above description relates to a single preferred embodiment of the present invention, however, it will be apparent that many modifications and variations can be effected by one skilled in the art without departing from the spirit and scope of the novel concepts of the present invention, wherein the scope of the invention may be determined only by the appended claims.

What is claimed is:

1. A microcomputer system, comprising:
   first central processing unit means having first input/output addresses;
   first memory means connected to said first central processing unit means;
   input/output means connected to said first central processing unit means for inputting data thereto and outputting data therefrom at respective addresses corresponding to said first input/output addresses and producing input/output control signals;
   second central processing unit means having second input/output addresses;
   second memory means connected to said second central processing unit means;
   first signal bus means operably connecting said first central processing unit means, said first memory means and said input/output means;
   second signal bus means operably connecting said second central processing unit means and said second memory means; and
   means connected to said first and second signal bus means and receiving over said first signal bus means said first input/output addresses of said first central processing unit means and said input/output control signals from said input/output means for mapping said second central processing unit means onto a selected one of said first input/output addresses of said first central processing unit means by placing said first and second signal bus means in data communication and including bus priority encoder means operably connected to said first and second signal bus means to give said first central processing unit means bus priority over said second central processing unit means with respect to both said first and second signal bus means.

2. A microcomputer system according to claim 1, in which said means for mapping said second central processing unit means onto a selected one of said first input/output addresses of said first central processing unit means by placing said first and second signal bus means in data communication includes signal generating means receiving selected said first input/output address of said first central processing unit means and said input/output control signals and producing decoding output signals therefrom, transceiver means operable in response to said decoding output signals for selectively connecting said frist and second signal bus means and determining the direction of data flow therebetween, data latch means operable in response to said decoding output signals and recieving data output from said first central processing unit means for supply to said second signal bus means, and bus driver means connected between said first and second signal bus means for passing data therebetween.

3. A microcomputer system according to claim 1, in which said means for mapping said second processing unit means onto a selected one of said first input/output addresses of said first central processing unit means includes signal generating means receiving at least said selected first input/output address of said first central processing unit means and said input/output control signals for decoding said selected first input/output address and producing a gating signal and a data direction signal, and transceiver means receiving said gating signal and said data direction signal and arranged to connect said first signal bus means with said second signal bus means and connected to be gated by said gating signal so that data flows between said first and second signal bus means in a direction responsive to said direction signal.

4. A microcomputer system according to claim 3, in which said signal generating means further produces latch clock signals from said first input/output addresses, and said means for mapping said second central processing unit means onto a selected one of said first input/output addresses of said first central processing unit means further includes data latch means connected between said first signal bus means and said second signal bus means for passing data therebetween in response to said latch clock signals, and bus driver means connected between said first signal bus means and said second signal bus means for passing data therebetween.

5. A microcomputer system according to claim 3, in which said bus priority encoder means includes first and second bus arbiter means connected to said first signal bus means and said second signal bus means, respectively, for controlling access to said first and second memory means for data transferred thereto, and a priority encoder connected to said first and second bus arbiter means for providing said first central processing unit means with said bus priority over said second central processing unit means when data is transferred to said first and second memory means at substantially the same time.

6. A microcomputer system according to claim 1, wherein said bus priority encoder means connected to said first and second signal bus means controls data flow therein, and includes bus arbiter means for controlling access to said first and second memory means for data transferred thereto, bus control means connected to said first and second signal bus means, and status signal generator means for generating status signals fed to enable said bus arbiter means that is connected to said first and second signal bus means and to enable said bus control means that is connected to said second signal bus means.

7. A microcomputer system according to claim 1, in which said first signal bus means includes a separate data bus, a separate address bus parallel to said data bus, and a separate control bus parallel to said address bus.

8. A microcomputer system according to claim 1, in which said first memory means includes a random access memory connected to said first central processing unit means and a read only memory connected to said first central processing unit means.

9. A microcomputer system according to claim 1, in which said second memory means includes a random access memory connected to said second central processing unit means and a read only memory connected to said second central processing means.

10. A microcomputer system according to claim 1, further comprising signal generating means connected to said first signal bus means for decoding at least said selected first input/output address mapped onto said first central processing unit means and producing a gating signal and a direction signal, and transceiver means receiving said gating signal and said direction signal, said transceiver means being included in said means for mapping said second central processing unit means onto a selected one of said first input/output addresses of said first central processing unit means, said gating signal and said direction signal being fed to said transceiver means for gating said transceiver means and determining the direction of data flow so that data can be transferred between said first and second central processing unit means without conflict.

11. A microcomputer system, comprising:
host computer means including first central processing unit means having data terminals and address terminals, and input/output means connected to said data and address terminals for inputting data and outputting data at respective input/output addresses of said first and central processing unit means and producing input/output control signals;
first memory means connected to said first central processing unit means;
second central processing unit means having data terminals and address terminals and being devoid of respective input/output means for inputting/outputting data;
second memory means connected to said second central processing unit means;
first bus means for operably connecting said first central processing unit means, said input/output means, and said first memory means;
second bus means for operably connecting said second processing means unit and said second memory means; and
means connected to said first and second bus means and receiving input/output addresses of said first central processing unit means and said input/output control signals from said input/output means for mapping said second central processing unit means onto a selected one of said input/output addresses of said first central processing unit means by placing said first and second bus means in data communication and including a bus priority encoder means connected to said first and second bus means and operating to provide said first central processing unit with bus priority over said second central processing unit with respect to said first and second data bus means.

12. A microcomputer system according to claim 11, in which said means for mapping said second central processing unit means onto a selected one of said input/output addresses of said first central processing unit means includes signal generating means receiving at least said selected input/output address of said first central processing means and said input/output control signals and producing decoding output signals therefrom, transceiver means receiving data from said first central processing unit means for selectively connecting said first and second bus means for data flow therebetween and determining the direction of said data flow in response to said decoding output signals, data latch means operable in response to said decoding output signals from said decoder means and receiving data from said first central processing unit for connection to said second bus means, and bus driver means for coupling selected data between said first and second bus means.

13. A microcomputer system according to claim 12, further comprising decoder means connected to said first bus means for decoding address information from said first central processing unit means and producing a gating signal and a direction signal fed to said transceiver means whereby data is controllable transferred between said first and second memory means.

14. A microcomputer system according to claim 11, in which said bus priority encoder means includes first and second bus arbiter means connected to said first and said second bus means, respectively, for controlling access of data transferred to said first and second memory means, and a priority encoder connected to said first and second bus arbiter means for providing said first central processing unit means with bus priority over said second central processing unit means when data is transferred to said first and second memory means substantially simultaneously.

15. A microcomputer system according to claim 13, in which said first bus means includes a separate data bus, a separate address bus parallel to said data bus, and a separate control bus parallel to said address bus.

16. A microcomputer system according to claim 11, in which said first memory means includes a random access memory and a read only memory each connected to said first central processing unit means including input/output means.

17. A microcomputer system according to claim 1, in which said second memory means includes a random access memory and a read only memory each connected to said second central processing unit means not including an input/output means.

* * * * *